Feb. 9, 1971              L. COHEN              3,561,866
FILM COLOR DENSITY SETTING INDICATOR
Filed Feb. 13, 1968              2 Sheets-Sheet 1
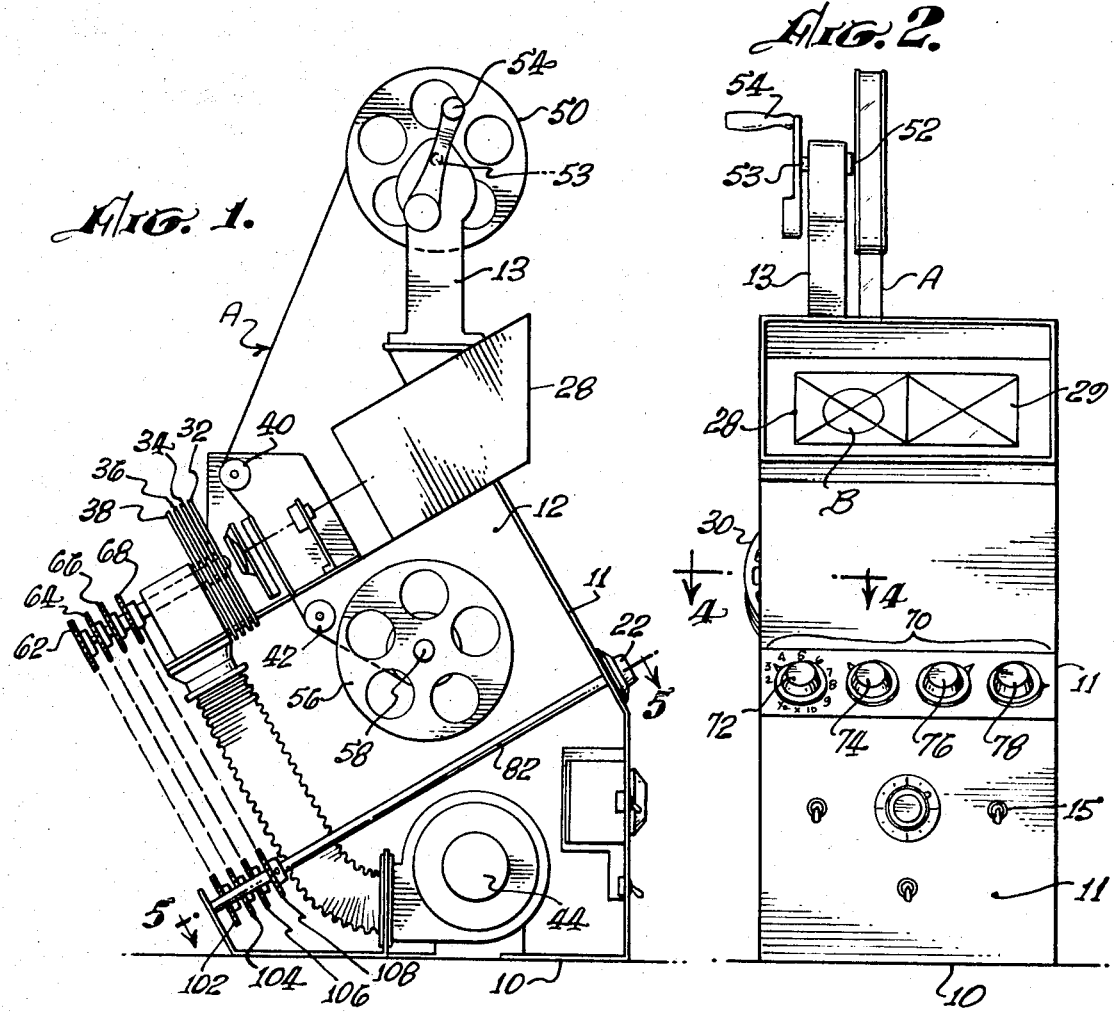
INVENTOR.
LESTER COHEN,
By His Attorneys
Spensley & Horn.

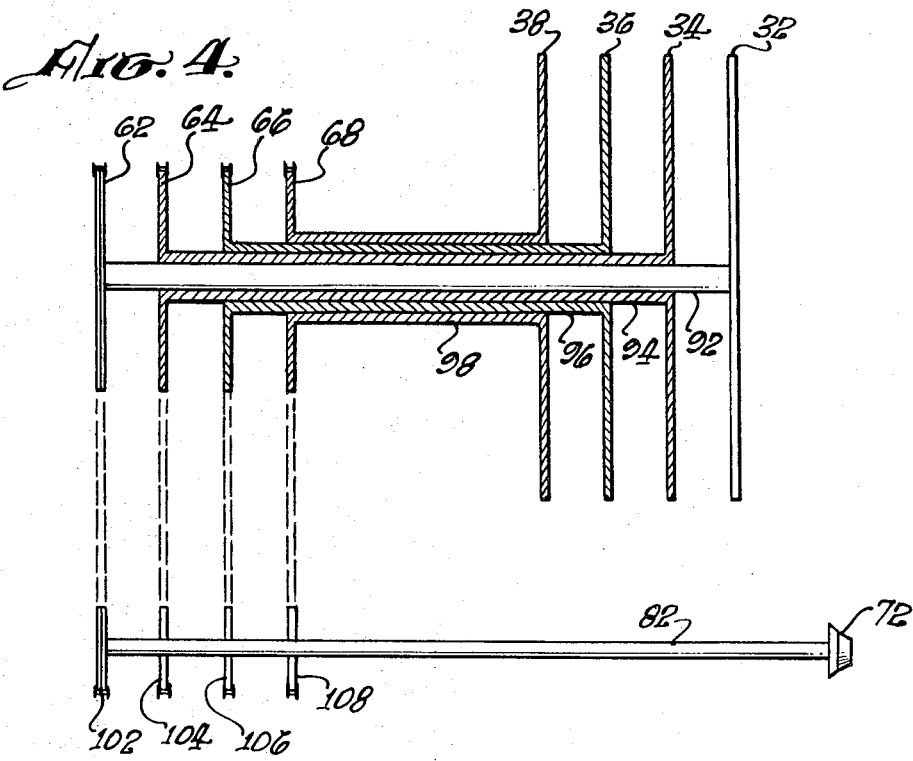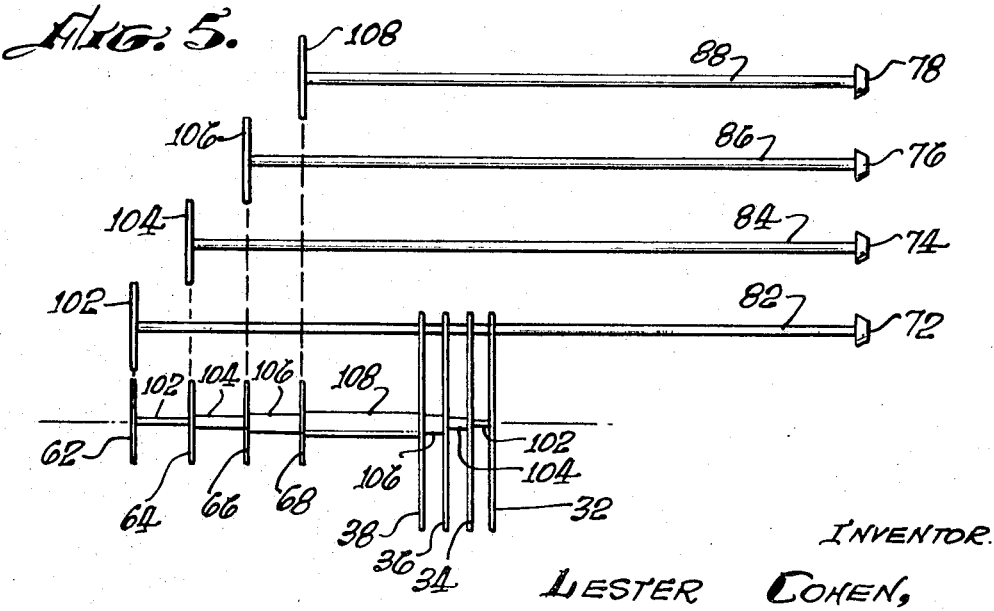

United States Patent Office 3,561,866
Patented Feb. 9, 1971

3,561,866
FILM COLOR DENSITY SETTING INDICATOR
Lester Cohen, Los Angeles, Calif., assignor to Cinefx, Inc. of California, Hollywood, Calif., a corporation of California
Filed Feb. 13, 1968, Ser. No. 705,198
Int. Cl. G03b 27/76
U.S. Cl. 355—35        6 Claims

ABSTRACT OF THE DISCLOSURE

A method to rapidly color balance and density balance a film interpositive and a film color density setting indicator comprising a light, a film guide, a plurality of color and density filters, appropriate lenses, and a screen in operative optical alignment, whereby a color image displayed on the screen can be color and density balanced.

BACKGROUND OF THE INVENTION

(1) Field of the invention

This invention relates to methods to determine the correct color and density filters required to produce a balanced color film negative and a film viewer apparatus to rapidly color balance and density balance a film image.

(2) Description of the prior art

The prior art relating to color and density balancing an interpositive movie film requires an expensive, time consuming process. There is presently lacking a device to inexpensively and rapidly accomplish motion picture film color and density balancing. The prior art has been concerned with devices using filters to directly produce a final negative, utilizing a variety of color lights, utilizing complicated electronic devices for measuring light intensity, or devices for copying a color negative. Such devices are not compatible for use in making motion picture films.

There is a lack of a method to accomplish color balancing and density balancing of a motion picture interpositive rapidly and economically. In the past, such methods require photographing each motion picture film frame through a plurality of color filters and a plurality of density filters. The standard procedure is: One interpositive film frame is photographed several times utilizing different color filter and density filter combinations for each separate exposure. The result is a film strip having about 30 different color density exposures. This film strip is then sent through the development process. After the film strip is developed, the variety of filtered images on the film strip are viewed. The most balanced or natural image is selected. The filter settings which produced the best color balanced and density balanced image are then utilized to re-photograph the desired scenes of of the interpositive film to produce the final film negative. The preceding method takes at least two days, requires very expensive equipment and a cameraman to produce the thirty image film strip, results in a delay for the developing process to develop the film strip, and requires a viewing of the developed film strip to select a balanced color image to determine the necessary filters related thereto. Any delay in film production is especially critical since schedules are fixed for both television and motion pictures and time is very expensive.

SUMMARY OF THE INVENTION

A method to determine color and density filter settings necessary to produce a balanced color film negative which includes: inserting a color interpositive film in a film viewer, color filter and density filter balancing the color interpositive image in the film viewer and providing the balanced filter settings to an optical printer.

An apparatus particularly suitable for use in the aforesaid method is a film color density setting indicator comprising a film illuminating source for illuminating a film, lens means for focusing and magnifying a film image, film guide means for supporting and aligning the film, a color pack to neutralize the base color of the interpositive film employed in the indicator, manually rotatable filter means for regulating the illuminating light frequencies passing therethrough, a screen to display the magnified film image and a housing means to support in operative optical alignment the aforesaid components. The previous time consuming and expensive process for determining the correct filters for color and density balancing a negative motion picture film is hereby remedied. A camera is no longer required, a film strip no longer has to be produced, thus eliminating the delay and expense of development, and the operator has a magnified image to work with when balancing the film image. Instead of a two day process to determine the correct filters, the new method takes less than a few minutes.

BRIEF DESCRIPTION OF THE DRAWING

FIG. 1 is a side view of the film color density setting indicator.

FIG. 2 is a front view of the indicator.

FIG. 3 is a schematic of a lens and filter arrangement which may be used in the indicator.

FIG. 4 is a cross sectional view of the filter wheel interconnections and a plan view of the selectivity control shafts.

FIG. 5 is a top view taken at line 5—5.

DESCRIPTION OF THE PREFERRED EMBODIMENT

The housing 12 supports in operative optical alignment, an illumianting source (lamp) 14, a focus lens 16, a heat glass 18, a color pack 20, filter wheels 30, a second focus lens 22, film guides 40, 42, a window 24, an objective lens 26 and a screen 28. The housing 12 includes a lamp switch 15 and a motor driven fan 44 to remove the heat generated by the lamp 14.

A feed reel 50 is mounted on a feed reel shaft 52 which extends through an arm extension 13 of the housing 12. A handle 54 is attached to the end 53 of the feed reel shaft 52 remote from the feed reel 50. It is within the scope of the present invention to include a motor driven feed reel drive. A takeup reel 56 is mounted on a motor driven takeup reel shaft 58 supported by the housing 12. Two film guides 40, 42 are provided to control proper optical alignment of a motion picture interpositive film A. A 4″ x 6″ screen 28 on the face 11 of the housing 12 may be comprised of a lens having a flat field. It is within the scope of the invention to have a screen 8″ x 10″, as well as any other convenient size. When an interpositive film A is placed in the film guides 40, 42 and the lamp 14 is energized, a magnified image B is displayed on the screen 28. The interposition film is typically a fine grained film having an orange base and used as a master film for subsequent rephotographing.

A color pack 20 comprising pre-selected filters is inserted into the optical alignment path intermediate the lamp 14 and the film A. The color pack 20 neutralizes the base color of the interpositive film A. The interposition film, as are most color films, has an orange base color; the color pack 20 neutralizes this base color and in effect compensates for the orange base color.

A plurality of filter wheels 30 are disposed in optical alignment intermediate the color pack 20 and the film A. The present embodiment shows three color filter wheels 32, 34, 36 and one density (neutral) filter wheel 38. Each color filter wheel 32, 34, 36 is comprised of a pluraltiy of color filters concentrically mounted thereon. The density filter wheel 38 is also comprised of a plurality of neutral filters concentrically mounted thereon. The filter wheels 30 are protected from the lamp heat by the heat glass 18 and the fan 44.

One, but not exclusive, embodiment has four selectivity controls 72, 74, 76, 78 mounted on the face 11 of the housing 12. Each selectivity control 72, 74, 76, 78 is independently mechanically connected to its respective filter wheel 32, 34, 36, 38. However, at least one of the selectivity controls 78 is connected to a density filter wheel 38. Filter wheel shaft 92 (FIG. 4) is joined to sprocket 62 and cyan filter wheel 32; shaft 94 is joined to sprocket 64 and magenta filter wheel 34; shaft 96 is joined to sprocket 66 and yellow filter wheel 36; shaft 98 is joined to sprocket 68 and density filter wheel 38. Shaft 92 is axially disposed within hollow shaft 94 which is axially disposed within hollow shaft 98. Shaft 82 is joined to cyan selectivity control 72 and sprocket 102; shaft 84 is joined to magenta selectivity control 74 and sprocket 104; shaft 86 is joined to yellow selectivity control 76 and sprocket 106; shaft 88 is joined to density selectivity control 78 and sprocket 108. Selectivity control sprockets 102, 104, 106, 108 are connected to filter wheel sprockets 62, 64, 66 and 68 respectively by a chain or belt drive. By this arrangement a plurality of filters may be independently adjusted but yet optically coupled to a single film.

Illustrative of an embodiment of the present invention, the cyan selectivity control 72 has 11 settings. Each setting represents a particular filter on the cyan filter wheel 32. By rotating the cyan color selectivity control 72, the filters on the cyan filter wheel 32 are interposed in the optical alignment path thereby controlling the light frequencies which illuminate the film A. The operator views the magnified image B displayed on the screen 28 and rotates the selectivity controls 72, 74, 76, 78 until a balanced image appears on the screen. The readings of the various filter setting are recorded for a balanced image. These readings are later employed in re-photographing and varying the film content.

In operation, a feed reel 50 containing an interpositive film A is inserted into the shaft 58 in the arm 13 of the indicator 10. The film A is passed around the film guides 40, 42 and attached to the takeup reel 56. The illuminating lamp 14 is energized and a magnified image B is displayed on the screen 28. A color pack 20 comprising preselected filters which will neutralize the base color of the interpositive film A is placed intermediate the optical alignment of the film A and the illuminating lamp 14. Illustrative of an embodiment of the present invention three color selectivity controls (yellow, cyan and magenta), 72, 74, 76 are manually rotated. Each selectivity controls 72, 74, 76 is separately connected to its respective color filter wheel 32, 34, 36, having a plurality of filters. A density filter wheel 38 having a plurality of neutral filters is manually rotated in a similar manner. Various combinations of the yellow, cyan, magenta and neutral filters are selected until the magnified image B displayed on the screen 28 appears to be color and density balanced. The ease and simplicity of rotating the filter wheels 30 by turning its respective selectivity control is obvious. Once the desired filter settings are obtained the readings from the selectivity controls 72, 74, 76, 78 are transferred to an optical printer (not shown).

The optical printer utilizes identical filters as those in the film color density setting indicator 10. When the recorded filter settings from the indicator 10 are set into the optical printer the same balanced color image B projected onto the screen 28 will be imprinted onto a final film negative when the same interpositive film image A is photographed in the optical printer.

It is within the scope of the present invention to utilize two screens, two film guides and associated reels, two illuminating lamps and a duplicate set of lenses to magnify a film image. Oftentimes it is desirable to color match an interpositive image with a positive image. The present invention has that capability.

At least one common application for which the indicator 10 is particularly suited is the method where an interpositive film A having colored scenes which must be reproduced on a negative film so that subtitles may be added to the scenes. Each film frame of a color scene, including those frames having subtitles, must be color balanced so that there is no discernible difference between the added subtitle frames and those without subtitles. There are other film production techniques which also require scenes being added to the original scenes to which this invention is applicable.

The method aspect of the invention is inserting a color interpositive film in a film viewer; color filter balancing a color interpositive image in said film viewer; density filter balancing said color interpositive image in said film viewer; and providing the balanced filter settings to an optical printer. This method of color balancing and density balancing a film negative is not limited to situations for reproducing an exact duplicate of the film frame. In other words, there is a variety of instances where this improved method can be applied.

It is also within the scope of the method invention to duplicate colored negatives by matching the images projected in a film color density setting indicator 10 having two screens 28, 29. The first screen 28 displays the magnified image B from the color interpositive film A, the second screen 29 displays a color image from a color positive film. The selectivity controls 72, 74, 76, 78 are rotated until the colors in the magnified interpositive image B displayed on the first screen 28 are matched to the colors in the magnified positive image displayed on the second screen 29. The filter settings required to match both images are provided to the optical printer where the interpositive film A is photographed to produce a final duplicate color negative.

Recognizing the development costs and the time delay of making a film strip used in the prior art, and the utilization of an optical printer and a cameraman for making the film strip, it is apparent that the new method disclosed herein is of vital significance to the motion picture film industry. The savings in time and money are obvious. Color and density balancing interpositive motion picture film is now a simple, inexpensive, rapid process requiring only one man without any special qualifications when accomplished by utilizing the film color density setting indicator disclosed herein.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:
1. A film color density setting indicator for use with a film having a base color comprising:
  (a) film illuminating source;
  (b) lens means for focusing and magnifying a film image;
  (c) film guide means for supporting and aligning said film comprising a feed reel, a film guide and a takeup reel, said feed reel and said takeup reel operable to move a motion picture film through said film guide;
  (d) a pre-selected color pack for neutralizing the base color of the film, said pack disposed intermediate said illuminating source and said film image;
  (e) a plurality of rotatable filter wheels for regulating said illuminating light frequencies passing therethrough, each of said wheels having a plurality of filters concentrically mounted thereon, said filter wheels intermediate said illuminating source and said film image;

(f) a screen for viewing said magnified film image;

(g) housing means to support in operative optical alignment said illuminating source, said lens means, said film guide means, said filter means and said screen; and (h) at least one selectivity control for each filter wheel, said controls mounted exteriorly to said housing and cooperatively coupled to said wheels such that each wheel is rotatable by at least one control.

2. In a film color density setting indicator as defined in claim 1 wherein said feed reel is mounted on a feed reel shaft passing through said feed reel and extending through an arm extension of said housing, said feed reel shaft remote from said feed reel having a handle attached thereto, whereby said feed reel can be rotated by turning said handle.

3. In a film color density setting indicator as defined in claim 2 wherein said rotatable filter wheels and said color density selectivity controls are mechanically interconnected.

4. In a film color density setting indicator as defined in claim 3 wherein said mechanical interconnection comprises each said filter wheel axially secured to a filter wheel shaft, said filter wheel shaft attached to a filter wheel shaft sprocket, each said color density selectivity control axially secured to a selectivity control shaft, said selectivity control shaft attached to a selectivity control sprocket, each said selectivity control sprocket joined to each said filter wheel shaft sprocket by a chain drive.

5. A film color density setting indicator for use with film having a base color comprising:
(a) film illuminating source;
(b) lens means for focusing and magnifying a color interpositive;
(c) a feed reel axially connected by a feed reel shaft to a handle, said feed reel shaft passing through an arm extension;
(d) a film guide;
(e) a takeup reel;
(f) a pre-selected color pack for neutralizing the base color of the film, said pack disposed in the path of said illuminating source and said lens means;
(g) at least three rotatable color filter wheels, each wheel having a plurality of color filters concentrically mounted thereon;
(h) at least one rotatable density filter wheel having at least three neutral filters concentrically mounted thereon;
(i) at least three color selectivity controls having specific color indications representative of each color filter on each said color filter wheel;
(j) a density selectivity control having specific density indications representative of each said neutral filter on said density filter wheel;
(k) chain sprocket drive shaft assemblies connecting each said color and density filter wheel with its respective color and density selectivity control;
(l) a screen for displaying said magnified color interpositive image; and
(m) housing means to support in operative optical alignment said illuminating source, said lens means, said film guide, said screen, said extension arm, said takeup reel, said color pack, said rotatable color filter wheels, said rotatable density filter wheel, and said sprockets and chain drive assembly, said color and density selectivity controls, said housing having a fan to remove the heat from said illuminating source.

6. In a film color density setting indicator as defined in claim 5 wherein said housing includes a second screen, a second film guide, a second lens means and a second film illuminating source whereby a positive film image can be displayed on said second screen.

References Cited

UNITED STATES PATENTS

| | | | |
|---|---|---|---|
| 3,273,451 | 9/1966 | Wilson | 355—35 |
| 2,256,385 | 9/1941 | Evans et al. | 355—35 |
| 2,049,556 | 8/1936 | Drapman et al. | 355—35 |
| 3,011,388 | 12/1961 | Baumbach et al. | 355—35 |
| 3,097,563 | 7/1963 | Weisglass | 355—38 |
| 3,100,419 | 8/1963 | Clapp | 355—38 |
| 3,438,709 | 4/1969 | Hatashita | 355—35 |

FOREIGN PATENTS

| | | | |
|---|---|---|---|
| 1,090,082 | 9/1960 | Germany | 355—35 |
| 1,178,700 | 5/1959 | France | 355—35 |

OTHER REFERENCES

Spencer, D. A.: Colour Photography in Practice, Great Britain, The Focal Press Ltd., 1966, pp. 176–177.

JOHN M. HORAN, Primary Examiner

D. J. CLEMENT, Assistant Examiner

U.S. Cl. X.R.

355—44